United States Patent [19]

Draaisma

[11] Patent Number: 5,764,449

[45] Date of Patent: Jun. 9, 1998

[54] MAGNETIC READ/WRITE HEAD PROVIDED WITH COPLANAR CONNECTION FACES

[75] Inventor: Eeltje Aize Draaisma, Eindhoven, Netherlands

[73] Assignee: U.S. Philips Corporation, New York, N.Y.

[21] Appl. No.: 851,155

[22] Filed: May 5, 1997

Related U.S. Application Data

[63] Continuation of Ser. No. 551,218, Oct. 31, 1995, abandoned.

[30] Foreign Application Priority Data

Nov. 24, 1994 [EP] European Pat. Off. .............. 94203414

[51] Int. Cl.$^6$ ............................................. G11B 5/31
[52] U.S. Cl. ............................................. 360/121
[58] Field of Search .................... 360/121, 122, 360/126, 113, 125

[56] References Cited

U.S. PATENT DOCUMENTS

| | | | |
|---|---|---|---|
| 4,072,993 | 2/1978 | Nomura et al. | 360/121 |
| 4,219,853 | 8/1980 | Albert et al. | 360/121 |
| 4,972,336 | 11/1990 | Reid et al. | 360/121 |
| 5,027,245 | 6/1991 | Nagata | 360/121 |
| 5,063,468 | 11/1991 | Best | 360/121 |
| 5,210,667 | 5/1993 | Zammit | 360/121 |
| 5,218,755 | 6/1993 | Gassen et al. | 360/113 |
| 5,220,473 | 6/1993 | Brock et al. | 360/121 |
| 5,237,476 | 8/1993 | Bischoff et al. | 360/121 |

FOREIGN PATENT DOCUMENTS

| | | | |
|---|---|---|---|
| 52-17810 | 10/1977 | Japan | 360/121 |
| 62-73410 | 4/1987 | Japan . | |
| 4305808 | 10/1992 | Japan . | |

OTHER PUBLICATIONS

IBM Technical Disclosure Bulletin, "Multi–Element Servoing Head", McCormick, vol. 17, No. 4, Sep. 1974, p. 979.

IBM Technical Disclosure Bulletin, "Interleaved Multielement Mag. Head", Kington, vol. 15, No. 6, Nov. 1972, p. 2035.

IBM Technical Disclosure Bulletin, "Method for Wiring a Magnetic Head", Church et al, vol. 23, No. 8, Jan. 1981, p. 3873.

*Primary Examiner*—Stuart S. Levy
*Assistant Examiner*—David L. Ometz
*Attorney, Agent, or Firm*—John C. Fox

[57] ABSTRACT

A magnetic head has a head face and a layered structure, comprising write elements (w1–w9), first connection faces (15) for the write elements and first connection elements (16) connecting the write elements to the first connection faces, as well as read elements (r1–r9), second connection faces (17a, 17b) for the read elements and second connection elements (18a, 18b) connecting the read elements to the second connection faces. The first connection faces for the write elements and the second connection faces for the read elements are coplanar, while, viewed spatially, the first connection faces and the second connection faces are arranged in groups. At least a row of first connection faces and at least a row of second connection faces can then be distinguished, while the rows are in alignment.

6 Claims, 3 Drawing Sheets

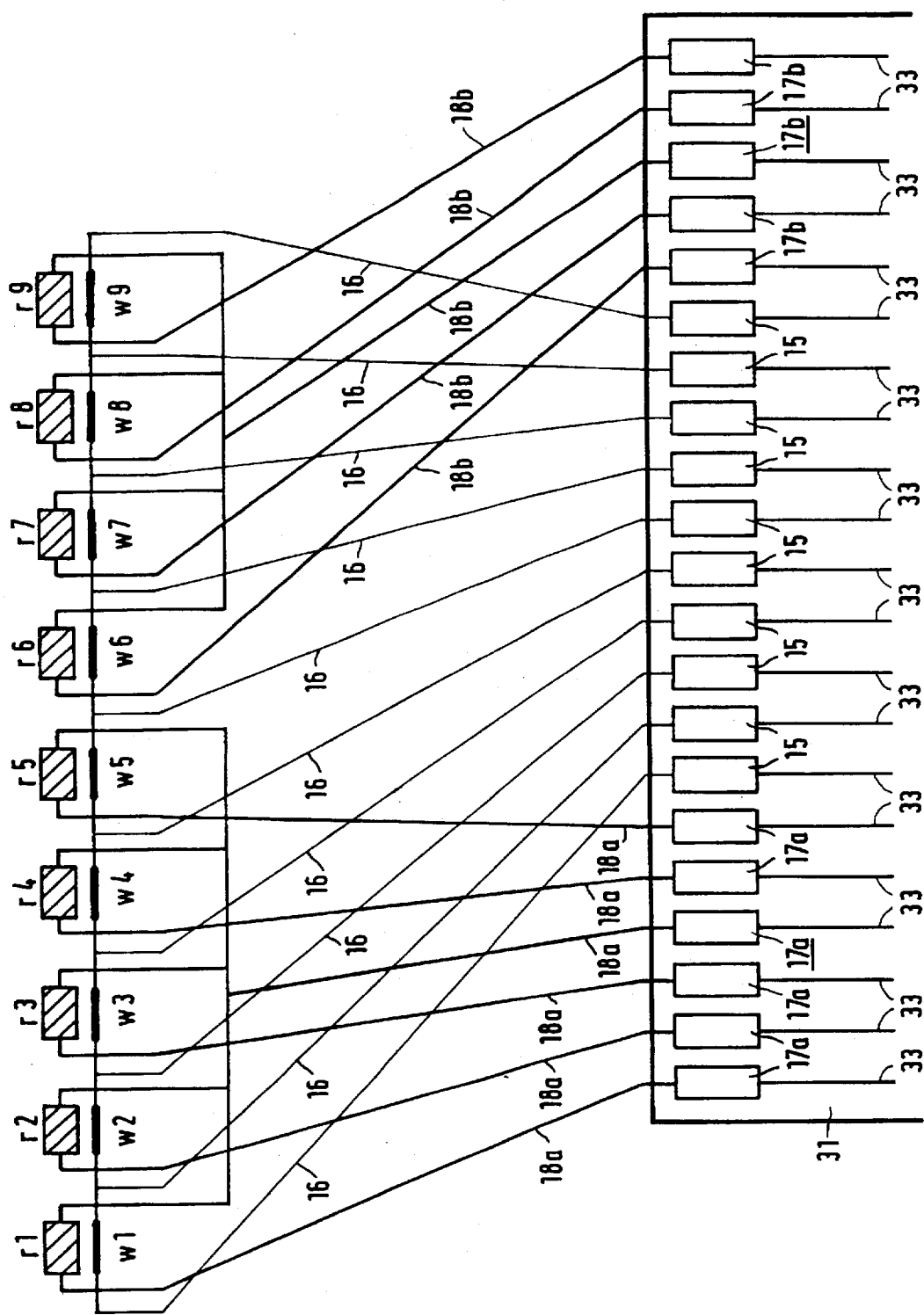

MAGNETIC READ/WRITE HEAD PROVIDED WITH COPLANAR CONNECTION FACES

This is a continuation of application Ser. No. 08/551,218, filed Oct. 31, 1995 now abandoned.

BACKGROUND OF THE INVENTION

The invention relates to a magnetic head having a head face and a layer structure, comprising write elements, first connection faces for the write elements and first connection elements connecting the write elements to the first connection faces, as well as read elements, second connection faces for the read elements and second connection elements connecting the read elements to the second connection faces.

Such a magnetic head is known from JP-A 4-305808 (herewith incorporated by reference). The known multichannel thin-film magnetic head has a head face and a digital playback head portion with magnetoresistive transducing elements and a digital recording head portion with inductive transducing elements. The magnetoresistive elements are connected by means of connection tracks to first connection faces present in a first plane and filling at least substantially the entire width of the magnetic head, while the inductive elements are connected by means of connection tracks to second connection faces present in a second plane extending parallel to and spaced apart from the first plane, which second connection faces, similarly as the first connection faces, are spread across at least substantially the entire width of the magnetic head.

The known magnetic head has the drawback that the connection faces which are present occur in two levels, which impedes securing of connection wiring to the first and second connection faces so that complex securing methods must be used. Generally, a connection foil is used as connection wiring. Such a connection foil has electric conductors or tracks which constitute loops with the transducing elements. In the known magnetic head, two such foils are required due to the used configuration of connection faces. Moreover, said arrangement of the connection faces in the known magnetic head leads to loops in the connection foils having such large dimensions that induction voltages may be a hindrance to the read elements as a result of the changing external magnetic loop flux. Moreover, due to the relatively large loops, a disturbing magnetic field may be generated when the write elements are being driven. The magnetic head has the further drawback that, viewed in a direction perpendicular to the head face, it is relatively large because the connection faces are present in two width zones.

OBJECTS AND SUMMARY OF THE INVENTION

It is an object of the invention to provide a compact magnetic head having write elements and read elements, which head has such connection faces that simple securing methods can be used for connecting a connection conductor, particularly a connection foil, to the connection faces and disturbing electromagnetic induction is inhibited during use of the magnetic head.

According to the invention, the magnetic head is characterized in that the first connection faces for the write elements and the second connection faces for the read elements are coplanar, while, viewed spatially, the first connection faces and the second connection faces are arranged in groups in which at least a row of first connection faces and at least a row of second connection faces can be distinguished.

The magnetic head according to the invention may be connected to suitable electronic circuitry, particularly combined or non-combined read and write amplifier ICs, by means of a single connection foil provided with a sufficient number of electric conductors. In principle, the conductors which are present in the connection foil extend parallel to each other. Since the connection faces in the magnetic head are arranged in groups and, viewed in a direction perpendicular to the head face of the magnetic head, are juxtaposed, the smallest possible loops can be formed when securing the connection foil. Since the size of a loop determines the extent of electromagnetic induction, disturbing induction is a minimum hindrance in the use of the magnetic head according to the invention.

In the magnetic head according to the invention, the write elements are preferably of an inductive type and the read elements are preferably of a magnetoresistive type. The magnetic head may be used in known recording apparatuses such as audio apparatuses or data storage apparatuses.

An embodiment of the magnetic head according to the invention is characterized in that the row of first connection faces and the row of second connection faces are at least substantially in alignment. Since the connection faces which are present are juxtaposed, the connection foil can be secured in a simple manner, for example by means of tape automated bonding or gluing. In the magnetic head according to the invention, all connection faces may be arranged in one strip or track defined by the width extending parallel to the head face of the magnetic head. In addition to the above-described advantage of minimum unwanted electromagnetic induction, this has the advantage that the magnetic head dimension transverse to the head face may be small so that wafers with a very large number of magnetic heads can be manufactured.

An embodiment of the magnetic head according to the invention is characterized in that one of the connection faces of the row of second connection faces is a common connection face to which several read elements are connected, said common connection face being situated in a central portion of the row of second connection faces. In this embodiment, the individual loops of the read elements have a minimum size.

An embodiment of the magnetic head according to the invention is characterized in that one of the connection faces of the row of first connection faces is a common connection face to which several write elements are connected, said common connection face being situated in a central portion of the row of first connection faces. In this embodiment, the individual loops of the write elements have a minimum size.

An embodiment of the magnetic head according to the invention is characterized by the presence of a connection foil having electric conductors which mutually extend at least substantially parallel and are secured to the connection faces.

BRIEF DESCRIPTION OF THE DRAWINGS

These and other aspects of the invention will be apparent from and elucidated with reference to the embodiments described hereinafter.

In the drawings:

FIG. 4 shows the embodiment of FIG. 1, provided with a connection foil.

DESCRIPTION OF THE PREFERRED EMBODIMENTS

Figure 1:
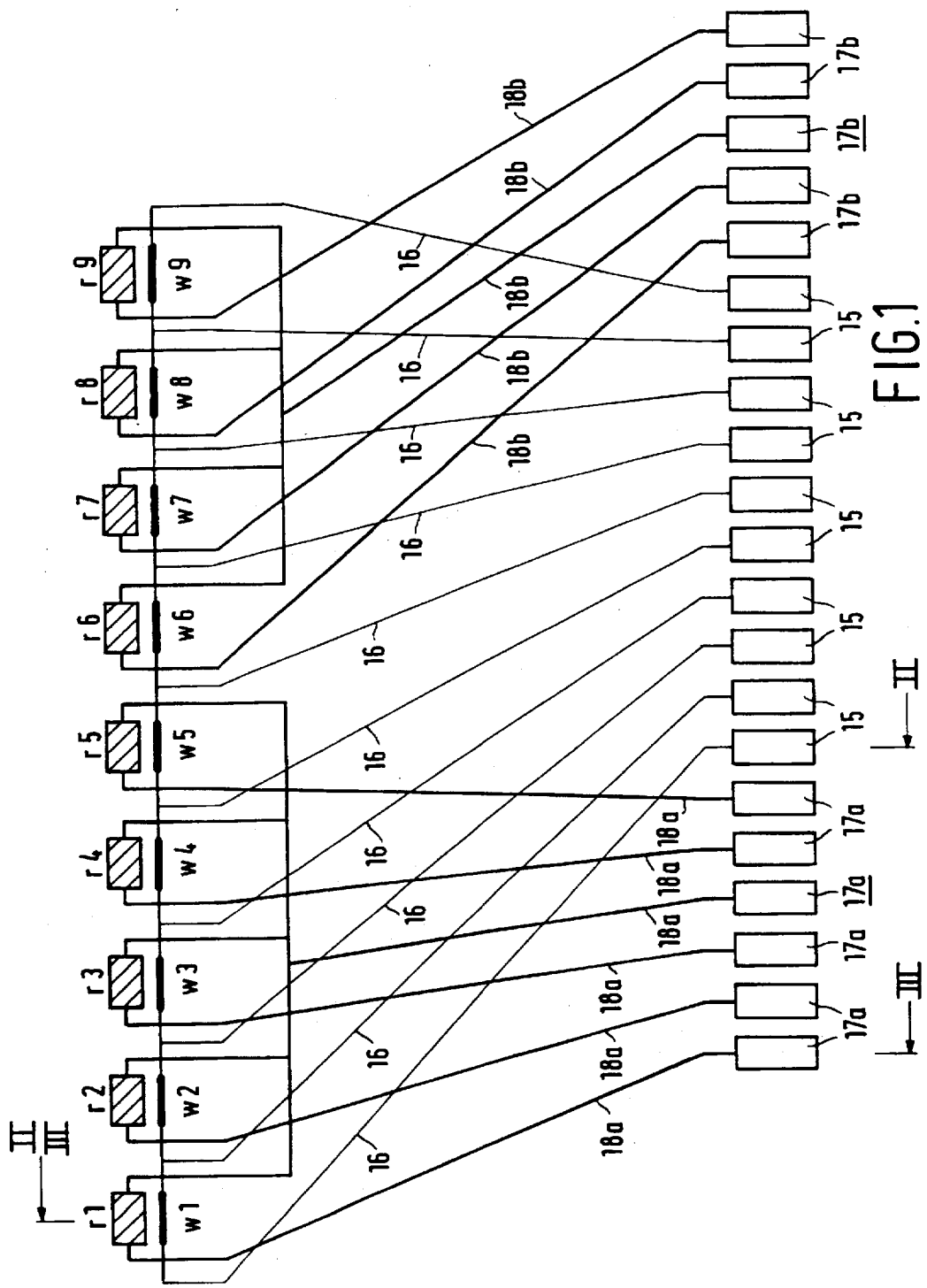
FIG. 1 shows diagrammatically a configuration of write elements, read elements and connection faces of an embodiment of the magnetic head according to the invention.
Figure 2:
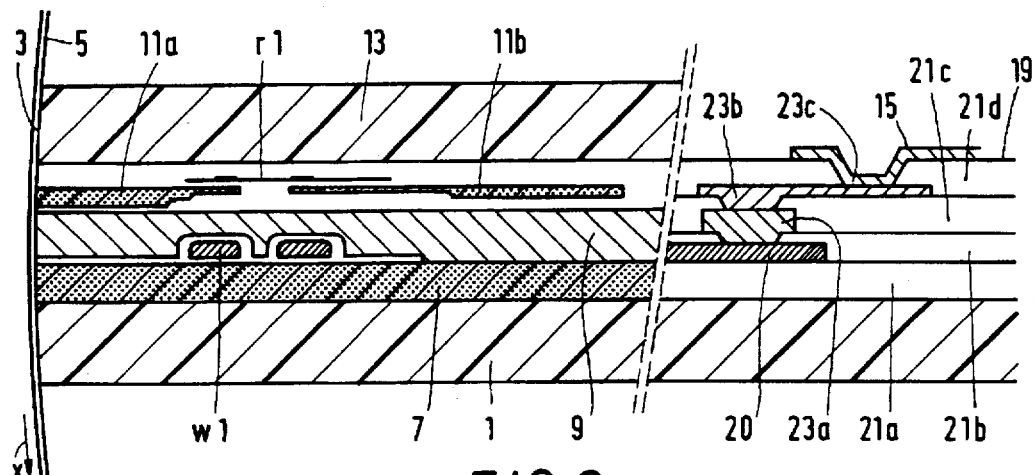
FIG. 2 shows diagrammatically a cross-section taken on the line II—II of the embodiment of FIG. 1.
Figure 3:
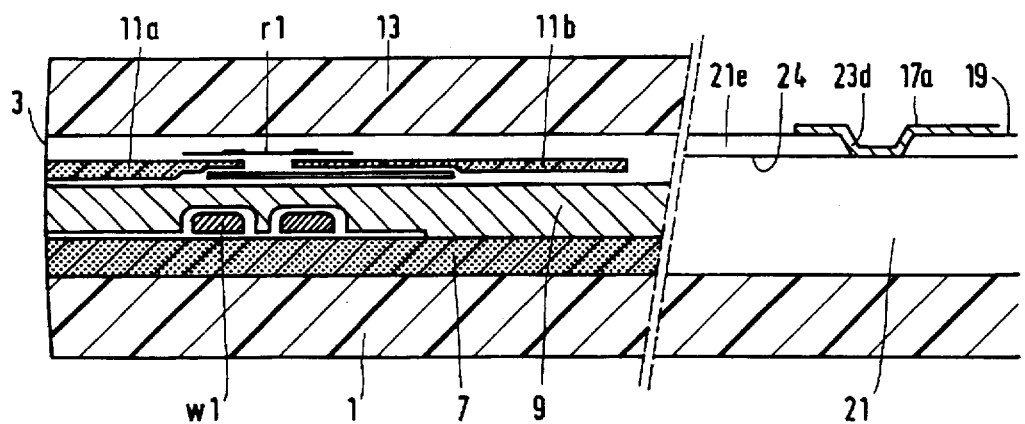
FIG. 3 shows diagrammatically a cross-section taken on the line III—III of the embodiment of FIG. 2.

The embodiment of the magnetic head according to the invention shown in FIGS. 1, 2 and 3 is known as a thin-film magnetic head. The magnetic head comprises a substrate 1 and a layer structure, in particular a thin film layer structure, provided on the substrate, and has a head face 3. The head face 3 is used for guiding a tape-shaped magnetic medium 5 moving in a direction x and may have a wear-resistant coating.

In this embodiment, the layer structure comprises nine write elements w1 to w9 and nine read elements r1 to r9. The write elements are constituted by windings of, for example Cu or Au, while the read elements are magnetoresistive elements, preferably provided with a plurality of known equipotential strips. The magnetoresistive material may be, for example an NiFe alloy.

The layer structure also comprises on the non-magnetic substrate 1, which is formed, for example from a ceramic material such as TiC, first flux guides 7 provided with second flux guides 9 and superjacent third flux guides 11a, 11b. The flux guides 7, 9 and 11a, 11b are made of a soft-magnetic material such as an NiFe alloy, CoZrNb or a ferrite. The first flux guides 7 and the second flux guides 9 constitute magnetic yokes for the write elements w1 to w9, while the second flux guides 9 together with the third flux guides 11a, 11b constitute magnetic yokes for the read elements r1 to r9. If desired, bias windings for adjusting the magnetoresistive elements may be present between the second flux guides 9 or between the third flux guides 11a, 11b.

To protect the layer structure, it is partly coated with a protective coating 13. Where necessary, the several layers of the layer structure are insulated from each other by insulation layers of, for example quartz, zirconium or aluminium oxide.

The layer structure further comprises first connection faces 15, first connection elements 16 which connect the first connection faces 15 to the write elements w1 to w9, second connection faces 17a and 17b and second connection elements 18a and 18b which connect the second connection faces 17a and 17b to the read elements r1 to r5 and the read elements r6 to r9, respectively. In this embodiment, all first connection faces 15 constitute one group of connection faces aligned in a row and the second connection faces 17a and 17b constitute two spatially separated groups of connection faces aligned in a row. All connection faces 15, 17a and 17b are located in one and the same plane 19 and jointly constitute one row of connection faces. Viewed in a direction perpendicular to the head face, the rows of connection faces are situated one behind the other.

In the magnetic head shown, two of the second connection faces 17a and 17b are formed as a common connection face. These connection faces, which are denoted by 17a and 17b in FIG. 1, are situated centrally and substantially centrally in the rows formed by the second connection faces 17a and 17b, respectively.

It is achieved by the arrangement of the connection faces 15, 17a and 17b in the shown magnetic head according to the invention that only one connection foil is required to electrically connect the magnetic head according to the invention in a magnetic scanning device, in this example a digital compact cassette apparatus. Moreover, it is of essential importance that due to the arrangement in groups of the connection faces 15, 17a and 17b, only magnetic loops of the smallest possible dimensions are present after the connection foil has been secured.

FIG. 2 shows by way of an example how the connections between the write elements and the first connection faces may be realized. The write element w1 shown in FIG. 2 has an electrically conducting connection track 20 which is provided on an insulation layer 21a of, for example quartz. The connection track 20 is connected to a connection face 15 in the plane 19 via electrically conducting through-connections 23a, 23b and 23c in insulation layers 21b, 21c and 21d, respectively, present on the insulation layer 21a. The connection track 20 and the through-connections 23a, 23b and 23c jointly constitute a first connection element 16. The other first connection elements are formed similarly. The through-connections may be provided by means of known thin-film techniques. If the material is electrically conducting, the same material as used for forming the flux guides, for example an NiFe alloy can be used for forming the through-connections.

FIG. 3 shows by way of an example how the connections between the read elements and the second connection faces may be realized. The read element r1 shown in FIG. 3 has an electrically conducting connection track 24 which is provided on an insulation layer 21. The connection track 24 is connected to a connection face 17a in the plane 19 via an electric through-connection 23d in an insulation layer 21e present on the insulation layer 21. The connection track 24 and the through-connection 23d jointly constitute a second connection element 18a. The other second connection elements are formed similarly.

FIG. 4 again shows the embodiment of the magnetic head according to the invention as shown in FIG. 1, but now it is provided with a connection foil 31. The connection foil 31 has a plurality of electric conductors 33 corresponding to the plurality of connection faces 15 and 17, each conductor being secured to a first connection face 15 or a second connection face 17. The electric conductors 33 extend parallel or approximately parallel to each other.

It is to be noted that the invention is not limited to the embodiment shown. For example, a larger or smaller number of read and write elements shown is possible. Moreover, the second connection faces for the read elements need not necessarily be divided into two groups. The connections between the write elements and the first connection faces may alternatively be realized in such a way that one of these connection faces functions as a central connection face.

I claim:

1. A magnetic head having a head face and a layer structure, comprising write elements, first connection faces for the write elements and first connection elements connecting the write elements to the first connection faces, as well as read elements, second connection faces for the read elements and second connection elements connecting the read elements to the second connection faces, the first connection faces for the write elements and the second connection faces for the read elements being coplanar, the first connection faces being arranged in at least one row of three consecutive first connection faces and the second connection faces being arranged in at least one row of three consecutive second connection faces, said at least one row of first connection faces and said at least one row of second connection faces being at least substantially in alignment, whereby one of the connection faces of said at least one row of first connection faces is a common connection face to which several write elements are connected, said common connection face being situated in a central portion of said at least one row of first connection faces.

2. A magnetic head as claimed in claim 1 provided with a connection foil having electric conductors which mutually extend at least substantially parallel and are secured to said first and second connection faces.

3. A magnetic head having a head face and a layer structure, comprising write elements, first connection faces for the write elements and first connection elements connecting the write elements to the first connection faces, as well as read elements, second connection faces for the read elements and second connection elements connecting the read elements to the second connection faces, the first connection faces for the write elements and the second connection faces for the read elements being coplanar, the first connection faces being arranged in at least one row of three consecutive first connection faces and the second connection faces being arranged in at least one row of three consecutive second connection faces, said at least one row of first connection faces and said at least one row of second connection faces being at least substantially in alignment, whereby one of the connection faces of said at least one row of second connection faces is a common connection face to which several read elements are connected, said common connection face being situated in a central portion of said at least one row of second connection faces.

4. A magnetic head as claimed in claim 3, provided with a connection foil having electric conductors which mutually extend at least substantially parallel and are secured to said first and second connection faces.

5. A magnetic head having a head face and a layer structure, comprising write elements, first connection faces for the write elements and first connection elements connecting the write elements to the first connection faces, as well as read elements, second connection faces for the read elements and second connection elements connecting the read elements to the second connection faces, the first connection faces for the write elements and the second connection faces for the read elements being coplanar, the first connection faces being arranged in at least one row of three consecutive first connection faces and the second connection faces being arranged in at least one row of three consecutive second connection faces, said at least one row of first connection faces and said at least one row of second connection faces being at least substantially in alignment, whereby one of the connection faces of said at least one row of first connection faces is a common connection face to which several write elements are connected, said common connection face being situated in a central portion of said at least one row of first connection faces and whereby one of the connection faces of said at least one row of second connection faces is a common connection face to which several read elements are connected, said common connection face being situated in a central portion of said at least one row of second connection faces.

6. A magnetic head as claimed in claim 5, provided with a connection foil having electric conductors which mutually extend at least substantially parallel and are secured to said first and second connection faces.

* * * * *